US008005425B2

(12) United States Patent  
Defossé et al.

(10) Patent No.: US 8,005,425 B2  
(45) Date of Patent: *Aug. 23, 2011

(54) METHOD AND SYSTEM FOR INTERFACING A MACHINE CONTROLLER AND A WIRELESS NETWORK

(75) Inventors: Erin M. Defossé, Austin, TX (US); Bryan W. Godwin, Round Rock, TX (US); William A. English, Austin, TX (US); Jizhi Wu, Austin, TX (US)

(73) Assignee: Crane Merchandising Systems, Inc., Bridgeton, MO (US)

( * ) Notice: Subject to any disclaimer, the term of this patent is extended or adjusted under 35 U.S.C. 154(b) by 190 days.

This patent is subject to a terminal disclaimer.

(21) Appl. No.: 11/279,174

(22) Filed: Apr. 10, 2006

(65) Prior Publication Data

US 2006/0183422 A1    Aug. 17, 2006

Related U.S. Application Data

(63) Continuation of application No. 09/895,647, filed on Jun. 29, 2001, now Pat. No. 7,164,884.

(51) Int. Cl.  
*H04B 5/00* (2006.01)

(52) U.S. Cl. ...................................... 455/41; 455/552.1

(58) Field of Classification Search ............. 455/41, 455/41.1, 41.2, 562.1, 554.2, 556.2, 416.1, 455/552.1, 526  
See application file for complete search history.

(56) References Cited

U.S. PATENT DOCUMENTS

| 3,784,737 A | 1/1974 | Waehner ........................ 178/6 |
| 4,369,442 A | 1/1983 | Werth et al. ............. 340/825.35 |
| 4,412,292 A | 10/1983 | Sedam et al. ................ 364/479 |
| 4,454,670 A | 6/1984 | Bachmann et al. ............ 40/584 |
| 4,553,211 A | 11/1985 | Kawasaki et al. ............ 364/479 |
| 4,611,205 A | 9/1986 | Eglise ...................... 340/825.35 |
| 4,661,862 A | 4/1987 | Thompson .................... 358/335 |
| 4,677,565 A | 6/1987 | Ogaki et al. .................. 364/479 |
| 4,766,548 A | 8/1988 | Cedrone et al. ............... 364/479 |
| 4,850,009 A | 7/1989 | Zook et al. ...................... 379/96 |
| 4,926,996 A | 5/1990 | Eglise et al. .................. 194/212 |
| 4,954,697 A | 9/1990 | Kokubun et al. ............. 235/381 |
| 5,029,098 A | 7/1991 | Levasseur .................... 364/479 |
| 5,077,582 A | 12/1991 | Kravette et al. .............. 355/206 |
| 5,090,589 A | 2/1992 | Brandes et al. .................. 221/2 |

(Continued)

FOREIGN PATENT DOCUMENTS

DE    41 40 450 A1    6/1993

(Continued)

OTHER PUBLICATIONS

Skywire Provides Details of Wireless 'VendView' System; Vending Times, Sep. 1994.

(Continued)

*Primary Examiner* — William J Deane

(57) ABSTRACT

A wireless interface module interfaces a machine control system, such as a vending machine controller, with one of plural wireless networks through one of plural removably coupled wireless transceivers. Communication between geographically distributed vending machines and a desired wireless network is supported by coupling a transceiver associated with the desired network to the wireless interface module. This advantageously provides flexibility in selecting from one of plural wireless networks for a distributed vending machine so that communication between the control system and a distal operating center is supported over a preferred wireless network through a standardized wireless interface module incorporated in the vending machine by changing the wireless transceiver removably coupled to the wireless interface module.

20 Claims, 3 Drawing Sheets

U.S. PATENT DOCUMENTS

| | | | |
|---|---|---|---|
| 5,091,713 A | 2/1992 | Horne et al. | 340/541 |
| 5,117,407 A | 5/1992 | Vogel | 369/30 |
| 5,184,179 A | 2/1993 | Tarr et al. | 355/206 |
| 5,207,784 A | 5/1993 | Schwartzendruber | 221/6 |
| 5,239,480 A | 8/1993 | Huegel | 364/479 |
| 5,255,819 A | 10/1993 | Peckels | 222/1 |
| 5,282,127 A | 1/1994 | Mii | 364/479 |
| 5,323,155 A | 6/1994 | Iyer et al. | 341/51 |
| 5,337,253 A | 8/1994 | Berkovsky et al. | 364/479 |
| 5,339,250 A | 8/1994 | Durbin | 364/479 |
| 5,371,348 A | 12/1994 | Kumar et al. | 235/472 |
| 5,386,360 A | 1/1995 | Wilson et al. | 364/146 |
| 5,400,246 A | 3/1995 | Wilson et al. | 364/146 |
| 5,418,945 A | 5/1995 | Carter et al. | 395/600 |
| 5,445,295 A | 8/1995 | Brown | 221/3 |
| 5,505,349 A | 4/1996 | Peckels | 222/641 |
| 5,507,411 A | 4/1996 | Peckels | 222/1 |
| 5,561,604 A | 10/1996 | Buckley et al. | 364/479.05 |
| 5,608,643 A | 3/1997 | Wichter et al. | 364/479.14 |
| 5,620,079 A | 4/1997 | Molbak | 194/217 |
| 5,649,308 A | 7/1997 | Andrews | 370/334 |
| 5,671,362 A | 9/1997 | Cowe et al. | 395/228 |
| 5,701,252 A * | 12/1997 | Facchin et al. | 235/375 |
| 5,708,223 A | 1/1998 | Wyss | 73/865.9 |
| 5,769,269 A | 6/1998 | Peters | 221/7 |
| 5,787,149 A | 7/1998 | Yousefi et al. | 379/59 |
| 5,794,144 A | 8/1998 | Comer et al. | 455/426 |
| 5,805,997 A | 9/1998 | Farris | 455/466 |
| 5,815,652 A * | 9/1998 | Ote et al. | 714/31 |
| 5,818,603 A | 10/1998 | Motoyama | 358/296 |
| 5,822,216 A | 10/1998 | Satchell, Jr. et al. | 364/479.01 |
| 5,841,866 A | 11/1998 | Bruwer et al. | 380/23 |
| 5,842,597 A | 12/1998 | Kraus et al. | 221/150 R |
| 5,844,808 A | 12/1998 | Konsmo et al. | 364/479.14 |
| 5,850,187 A | 12/1998 | Carrender et al. | 340/825.54 |
| 5,860,362 A | 1/1999 | Smith | 101/494 |
| 5,862,517 A | 1/1999 | Honey et al. | 364/559 |
| 5,867,688 A | 2/1999 | Simmon et al. | 395/500 |
| 5,892,758 A | 4/1999 | Argyroudis | 370/335 |
| 5,898,904 A | 4/1999 | Wang | 455/31.3 |
| 5,905,442 A | 5/1999 | Mosebrook et al. | 340/3.7 |
| 5,905,882 A | 5/1999 | Sakagami et al. | 700/86 |
| 5,907,491 A | 5/1999 | Canada et al. | 364/468.15 |
| 5,909,183 A | 6/1999 | Borgstahl et al. | 340/825.22 |
| 5,915,207 A | 6/1999 | Dao et al. | 455/9 |
| 5,918,213 A | 6/1999 | Bernard et al. | 705/26 |
| 5,924,081 A | 7/1999 | Ostendorf et al. | 705/30 |
| 5,930,770 A | 7/1999 | Edgar | 705/28 |
| 5,930,771 A | 7/1999 | Stapp | 705/28 |
| 5,941,363 A | 8/1999 | Partyka et al. | 194/217 |
| 5,943,042 A | 8/1999 | Siio | 345/172 |
| 5,949,779 A | 9/1999 | Mostafa et al. | 370/389 |
| 5,950,630 A | 9/1999 | Portwood et al. | 128/897 |
| 5,956,487 A | 9/1999 | Venkatraman et al. | 709/218 |
| 5,957,262 A | 9/1999 | Molbak et al. | 194/200 |
| 5,959,536 A | 9/1999 | Chambers et al. | 710/104 |
| 5,959,869 A | 9/1999 | Miller et al. | 364/479.1 |
| 5,979,757 A | 11/1999 | Tracy et al. | 235/383 |
| 5,982,325 A | 11/1999 | Thornton et al. | 342/357.07 |
| 5,982,652 A | 11/1999 | Simonelli et al. | 363/142 |
| 5,986,219 A | 11/1999 | Carroll et al. | 177/1 |
| 5,991,749 A | 11/1999 | Morrill, Jr. | 705/44 |
| 5,997,170 A | 12/1999 | Brodbeck | 364/479.06 |
| 6,003,070 A | 12/1999 | Frantz | 709/206 |
| 6,005,850 A | 12/1999 | Moura et al. | 370/282 |
| 6,012,041 A | 1/2000 | Brewer et al. | 705/28 |
| 6,021,324 A | 2/2000 | Sizer, II et al. | 455/403 |
| 6,021,437 A | 2/2000 | Chen et al. | 709/224 |
| 6,029,143 A | 2/2000 | Mosher et al. | 705/28 |
| 6,032,202 A | 2/2000 | Lea et al. | 710/8 |
| 6,038,491 A | 3/2000 | McGarry et al. | 700/231 |
| 6,052,667 A | 4/2000 | Walker et al. | 705/15 |
| 6,052,750 A | 4/2000 | Lea | 710/72 |
| 6,056,194 A | 5/2000 | Kolls | 235/381 |
| 6,057,758 A | 5/2000 | Dempsey et al. | 340/539 |
| 6,061,668 A | 5/2000 | Sharrow | 705/400 |
| 6,068,305 A | 5/2000 | Myers et al. | 292/201 |
| 6,070,070 A | 5/2000 | Ladue | 455/419 |
| 6,072,521 A | 6/2000 | Harrison et al. | 348/12 |
| 6,084,528 A | 7/2000 | Beach et al. | 340/825.35 |
| 6,085,888 A | 7/2000 | Tedesco et al. | 194/217 |
| 6,109,524 A | 8/2000 | Kanoh et al. | 235/381 |
| 6,119,053 A | 9/2000 | Taylor et al. | 700/231 |
| 6,119,100 A | 9/2000 | Walker et al. | 705/20 |
| 6,124,800 A | 9/2000 | Beard et al. | 340/825.35 |
| 6,131,399 A | 10/2000 | Hall | 62/127 |
| 6,161,059 A | 12/2000 | Tedesco et al. | 700/232 |
| 6,163,811 A | 12/2000 | Porter | 709/247 |
| 6,181,981 B1 | 1/2001 | Varga et al. | 700/236 |
| 6,185,545 B1 | 2/2001 | Resnick et al. | 705/40 |
| 6,199,753 B1 | 3/2001 | Tracy et al. | 235/375 |
| 6,230,150 B1 | 5/2001 | Walker et al. | 705/400 |
| 6,272,395 B1 | 8/2001 | Brodbeck | 700/236 |
| 6,289,453 B1 | 9/2001 | Walker et al. | 713/175 |
| 6,304,895 B1 | 10/2001 | Schneider et al. | 709/203 |
| 6,317,649 B1 | 11/2001 | Tedesco et al. | 700/232 |
| 6,324,520 B1 | 11/2001 | Walker et al. | 705/16 |
| 6,338,149 B1 | 1/2002 | Ciccone, Jr. et al. | 714/38 |
| 6,339,731 B1 * | 1/2002 | Morris et al. | 700/236 |
| 6,341,271 B1 | 1/2002 | Salvo et al. | 705/28 |
| 6,356,794 B1 | 3/2002 | Perin, Jr. et al. | 700/78 |
| 6,385,772 B1 | 5/2002 | Courtney | 725/105 |
| 6,427,912 B1 | 8/2002 | Levasseur | 235/381 |
| 6,434,534 B1 | 8/2002 | Walker et al. | 705/14 |
| 6,437,692 B1 | 8/2002 | Petite et al. | 340/540 |
| 6,442,532 B1 | 8/2002 | Kawan | 705/35 |
| 6,457,038 B1 | 9/2002 | Defosse | 709/200 |
| 6,462,644 B1 | 10/2002 | Howell et al. | 340/5.92 |
| 6,467,685 B1 | 10/2002 | Teicher | 235/379 |
| 6,502,131 B1 | 12/2002 | Vaid et al. | 709/224 |
| 6,505,095 B1 | 1/2003 | Kolls | 700/244 |
| 6,525,644 B1 | 2/2003 | Stillwagon | 340/5.61 |
| 6,550,672 B1 | 4/2003 | Tracy et al. | 235/383 |
| 6,553,336 B1 | 4/2003 | Johnson et al. | 702/188 |
| 6,581,986 B2 | 6/2003 | Roatis et al. | 292/199 |
| 6,584,309 B1 | 6/2003 | Whigham | 455/414 |
| 6,585,622 B1 | 7/2003 | Shum et al. | 482/8 |
| 6,604,086 B1 | 8/2003 | Kolls | 705/14 |
| 6,604,087 B1 | 8/2003 | Kolls | 705/14 |
| 6,606,602 B1 | 8/2003 | Kolls | 705/14 |
| 6,606,605 B1 | 8/2003 | Kolls | 705/26 |
| 6,609,113 B1 | 8/2003 | O'Leary et al. | 705/39 |
| 6,615,623 B1 | 9/2003 | Ormerod | 70/224 |
| 6,628,764 B1 | 9/2003 | Petite | |
| 6,695,166 B2 | 2/2004 | Long | 221/14 |
| 6,704,714 B1 | 3/2004 | O'Leary et al. | 705/39 |
| 6,705,520 B1 | 3/2004 | Pitroda et al. | |
| 6,712,266 B2 | 3/2004 | Bartley et al. | 235/380 |
| 6,714,977 B1 | 3/2004 | Fowler et al. | 709/224 |
| 6,735,630 B1 | 5/2004 | Gelvin et al. | 709/224 |
| 6,738,811 B1 | 5/2004 | Liang | 709/224 |
| 6,748,296 B2 | 6/2004 | Banerjee et al. | 700/241 |
| 6,751,562 B1 | 6/2004 | Blackett et al. | 702/61 |
| 6,754,558 B2 | 6/2004 | Preston et al. | 700/236 |
| 6,772,048 B1 | 8/2004 | Leibu et al. | 700/241 |
| 6,826,607 B1 | 11/2004 | Gelvin et al. | 709/224 |
| 6,832,251 B1 | 12/2004 | Gelvin et al. | 709/224 |
| 6,837,436 B2 | 1/2005 | Swartz et al. | 235/472.02 |
| 6,844,813 B2 | 1/2005 | Hardman | 340/539.1 |
| 6,850,252 B1 | 2/2005 | Hoffberg | 345/716 |
| 6,859,831 B1 | 2/2005 | Gelvin et al. | 709/224 |
| 6,867,685 B1 | 3/2005 | Stillwagon | 340/5.64 |
| 6,876,988 B2 | 4/2005 | Helsper et al. | 706/21 |
| 6,900,720 B2 | 5/2005 | Denison et al. | 340/5.9 |
| 6,925,335 B2 | 8/2005 | May et al. | 700/9 |
| 6,959,265 B1 | 10/2005 | Candela et al. | 702/186 |
| 6,973,475 B2 | 12/2005 | Kenyon et al. | 709/203 |
| 7,010,594 B2 | 3/2006 | Defosse | |
| 7,013,337 B2 | 3/2006 | Defosse et al. | |
| 7,017,085 B2 | 3/2006 | Braun | 714/47 |
| 7,076,329 B1 | 7/2006 | Kolls | 700/232 |
| 7,103,511 B2 | 9/2006 | Petite | |
| 7,110,954 B2 | 9/2006 | Yung et al. | |
| 7,131,575 B1 | 11/2006 | Kolls | 235/379 |
| 7,152,783 B2 | 12/2006 | Charrin | |
| 7,164,884 B2 | 1/2007 | Defosse et al. | |
| 7,181,501 B2 | 2/2007 | Defosse | |

| | | | |
|---|---|---|---|
| 7,181,517 B1 | 2/2007 | Iavergne et al. | |
| 7,185,014 B1 | 2/2007 | Hansen | |
| 7,191,034 B2 | 3/2007 | Whitten et al. | 700/244 |
| 7,286,901 B2 | 10/2007 | Whitten et al. | 700/244 |
| 7,397,907 B2 | 7/2008 | Petite | |
| 7,489,913 B2 * | 2/2009 | Welnick et al. | 455/140 |
| 7,522,880 B2 | 4/2009 | Stieber et al. | |
| 2001/0002210 A1 | 5/2001 | Petite | 379/155 |
| 2001/0034566 A1 | 10/2001 | Offer | 700/236 |
| 2001/0042121 A1 | 11/2001 | Defosse et al. | 709/224 |
| 2001/0047410 A1 | 11/2001 | Defosse | 709/224 |
| 2001/0054083 A1 | 12/2001 | Defosse | 709/217 |
| 2002/0005707 A1 | 1/2002 | Kerai et al. | |
| 2002/0016829 A1 | 2/2002 | Defosse | 709/217 |
| 2002/0024420 A1 | 2/2002 | Ayala et al. | 340/5.61 |
| 2002/0032470 A1 | 3/2002 | Linberg | 607/60 |
| 2002/0038432 A1 | 3/2002 | Hsu | |
| 2002/0077724 A1 | 6/2002 | Paulucci et al. | 700/231 |
| 2002/0082665 A1 | 6/2002 | Haller et al. | 607/60 |
| 2002/0107610 A1 | 8/2002 | Kaehler et al. | 700/232 |
| 2002/0123966 A1 | 9/2002 | Chu et al. | |
| 2002/0133581 A1 | 9/2002 | Schwartz et al. | |
| 2002/0169539 A1 | 11/2002 | Menard et al. | 701/200 |
| 2002/0194387 A1 | 12/2002 | Defosse | 709/251 |
| 2003/0003865 A1 | 1/2003 | Defosse et al. | 455/41 |
| 2003/0013482 A1 | 1/2003 | Brankovic | 455/553 |
| 2003/0050841 A1 | 3/2003 | Preston et al. | 705/16 |
| 2003/0061094 A1 | 3/2003 | Banerjee et al. | 705/14 |
| 2003/0074106 A1 | 4/2003 | Butler | 700/236 |
| 2003/0097474 A1 | 5/2003 | Defosse et al. | 709/246 |
| 2003/0101257 A1 | 5/2003 | Godwin | 709/223 |
| 2003/0101262 A1 | 5/2003 | Godwin | 709/224 |
| 2003/0128101 A1 | 7/2003 | Long | 340/5.26 |
| 2003/0158625 A1 | 8/2003 | Carstens et al. | |
| 2003/0204391 A1 | 10/2003 | May et al. | 704/8 |
| 2004/0133653 A1 | 7/2004 | Defosse et al. | |
| 2004/0207509 A1 | 10/2004 | Mlynarczyk et al. | 340/5.23 |
| 2005/0131577 A1 | 6/2005 | Ota et al. | 700/242 |
| 2005/0161953 A1 | 7/2005 | Roatis et al. | 292/199 |
| 2005/0179544 A1 | 8/2005 | Sutton et al. | 340/543 |
| 2007/0096867 A1 | 5/2007 | Denison et al. | 340/5.23 |
| 2007/0100649 A1 | 5/2007 | Walker et al. | |
| 2008/0195762 A1 | 8/2008 | Wood | |

FOREIGN PATENT DOCUMENTS

| | | |
|---|---|---|
| EP | 0 564 736 A1 | 10/1993 |
| EP | 0 602 787 A2 | 10/1993 |
| EP | 0 817 138 A1 | 1/1998 |
| EP | 0 999 529 | 5/2000 |
| EP | 1096408 | 5/2001 |
| FR | 2 744 545 | 2/1996 |
| FR | 2 755776 | 5/1998 |
| JP | 04253294 | 9/1992 |
| JP | 6296335 A2 | 10/1994 |
| JP | 9198172 A2 | 7/1997 |
| JP | 10105802 | 4/1998 |
| WO | WO 89/07807 | 8/1989 |
| WO | WO 95/04333 | 2/1995 |
| WO | WO 95/05609 | 2/1995 |
| WO | WO 97/09667 | 3/1997 |
| WO | WO 98/45779 | 10/1998 |
| WO | WO 99/23620 | 5/1999 |
| WO | WO 99/27465 | 6/1999 |
| WO | WO 99/36751 | 7/1999 |
| WO | WO 99/48065 | 9/1999 |
| WO | WO 00/04475 | 1/2000 |
| WO | WO 00/04476 | 1/2000 |
| WO | WO 00/31701 | 6/2000 |
| WO | WO 02/19281 | 3/2002 |

OTHER PUBLICATIONS

Wireless Communications Forum; vol. III, No. 1 pp. 25-30, Apr. 1995.

Left high and dry? Sold-out machine sends for Cokes; Nashville Banner, Aug. 16, 1995.

Leitch, Carolyn, "Coke machines signal when it's time for a refill"; The Globe & Mail, Toronto, Ontario, Aug. 30, 1995.

Meet the Smart Coke Machine; The Sacramento Bee Business Technology; Wednesday, Aug. 30, 1995.

Skywire allows vendor tracking of pop stock and sales details; RCR, vol. 14, No. 17, Sep. 4, 1995.

International Search Report for PCT/US99/05983 7 pages, Aug. 13, 1999.

American Power Conversion Internet Article, "Lightning Advisor", at internet <http://lightning.apcc.com>, May 10, 2000.

American Products Internet Article, "Product Information", at internet, <http://www.apc.com>, May 10, 2000.

NetBotz Internet Article, "Welcome to Netbotz" at internet <http:www.netbotz.com>, May 10, 2000.

*BT redcare Telemetry Vending Interface Unit (VIU)*, Antronics Ltd Case Study, <http:www.antronic.co.uk/portfolio/viu>, 4 pgs, 2001.

International Search Report PCT/US01/16749, Dec. 20, 2001.

International Search Report PCT/US01/15522, May 16, 2002.

International Search Report PCT US 01/41640, Aug. 21, 2002.

International Search Report PCT/US 01/31381, Nov. 7, 2002.

International Preliminary Examination Report PCT/US01/31381, May 12, 2003.

International Search Report PCT/US 03/37776, May 17, 2004.

What is an iButton?, Maxim/Dallas, http://www.maxim-ic.com/products/ibutton/ibuttons/, 3 pages, Dec. 29, 2005.

NAMA White Paper: Cashless Vending, The National Automatic Merchandising Association (34 pages), 2004.

Cashless—Definition from the Merriam-Webster Online Dictionary; 2 pages, Printed Sep. 9, 2008.

Office Action dated Oct. 6, 2004 in connection with U.S. Appl. No. 09/895,647.

Office Action dated Jul. 5, 2005 in connection with U.S. Appl. No. 09/895,647.

Office Action dated Sep. 8, 2009 in connection with U.S. Appl. No. 11/539,331.

Office Action dated Mar. 26, 2010 in connection with U.S. Appl. No. 11/772,533.

Office Action dated Jun. 16, 2010 in connection with U.S. Appl. No. 11/691,789.

Office Action dated Sep. 8, 2010 in connection with U.S. Appl. No. 11/772,533.

Office Action dated Jul. 26, 2010 in connection with U.S. Appl. No. 11/608,987.

Office Action dated Jan. 7, 2011 in connection with U.S. Appl. No. 11/608,987.

* cited by examiner

METHOD AND SYSTEM FOR INTERFACING A MACHINE CONTROLLER AND A WIRELESS NETWORK

RELATED APPLICATION

This application is a continuation of U.S. patent application Ser. No. 09/895,647 entitled "Method and System for Interfacing a Machine Controller and Wireless Network" filed Jun. 29, 2001, now U.S. Pat. No. 7,164,884.

TECHNICAL FIELD

The present invention relates in general to the field of remote data acquisition and transmission, and more particularly, to a method and system for interfacing a machine control system and a wireless network for communicating information such as for monitoring and controlling distributed machines, such as vending machines.

BACKGROUND OF THE INVENTION

Although industrial and commercial equipment manufacturers have developed new and innovative equipment for managing, monitoring and controlling remotely-distributed industrial equipment and machine controllers, significant difficulties remain in the seamless integration of available wireless technology into industrial equipment. For instance, remotely distributed vending machines are sometimes interfaced with a central data and control center to monitor and control inventory. Wireless communications are one possible way of transmitting vending machine information from remote locations. However, fragmented communication networks provide a challenge for incorporating wireless communication into remotely located systems. More specifically, different geographical locations employ different wireless communication networks. Thus it is difficult to deploy wireless communications systems that are reliably interfaced with a wireless network in a given geographical location. There simply is not a cost effective wireless system uniformly available throughout the United States.

One possible solution is to provide wireless communications as an add-on package external to the industrial equipment. However, integration of add-on wireless communications with the industrial equipment tends to increase costs compared with integration of wireless communications into the industrial equipment. Further, the difficulty of deploying compatible wireless communications is compounded where the communications system is integrated into industrial machine controllers, such as vending machine controllers, at the time of manufacture of the industrial machine. For instance, if a vending machine is built with a given wireless system, the cost of shipping the vending machine is wasted if the wireless systems proves incompatible or unreliable at the destination location. Although the vending machine may be built with multiple wireless communication systems, this increases the expense of the design and configuration of specific systems and may lead to delay in production of such systems.

Another difficulty associated with deploying wireless systems is that multiple systems often work in a given geographical area with one wireless system preferable over the other available systems. For example, two wireless networks may be available for communicating information in a given location. However, one of the networks may have a stronger signal based on the position or location of the system within a building or structure. If a system is designed to communicate with the weaker network, the system's performance may be reduced compared with the performance available were the system able to interact with the other wireless network having a stronger signal.

SUMMARY OF THE INVENTION

Therefore a need has arisen for a system and method which aids in the distribution of industrial machines over distributed geographical regions with wireless communications that are compatible with different wireless communications systems operable in the geographical regions.

A further need has arisen for a system and method which embeds wireless communications into industrial machines such that the machines adapt to a variety of wireless networks without including compatibility for each potential type of network in each machine.

In accordance with teachings of the present disclosure, a system and method are provided that substantially eliminates or reduces disadvantages and problems associated with previously developed systems and methods for integrating wireless communications with industrial machines. A wireless interface module communicates with the industrial machine control system and with a wireless network through one of plural wireless transceivers. By selecting a wireless transceiver that is compatible with a selected wireless network for installation in an industrial machine at a selected geographic location, the wireless interface module provides an integrated system with flexibility for industrial machine communication with a preferred wireless network.

More specifically, a wireless interface module establishes a standardized communication interface with an industrial machine control system, such as a vending machine control system. The vending machine control system communicates available control information, such as the status of the vending machine or inventory of vending items, to the wireless interface module. For instance, the wireless interface module couples into a standardized slot of the control system. The wireless interface module then provides the vending machine information to a wireless transceiver so that the information is communicated from the remote geographic location to a central location through a desired wireless network. The wireless transceivers are removably coupled to the wireless interface module with a standardized port so that changing from one wireless network to another is easily accomplished by replacing a removably coupled transceiver with a new removably coupled transceiver associated with the desired wireless network.

The wireless interface module is operable to communicate with one of plural wireless transceivers, with each wireless transceiver compatible with one of the plural wireless communication networks. In order to locate a vending machine at a predetermined location so that the vending machine is compatible with a desired wireless network associated with the location, a compatible wireless transceiver is installed to communicate with the wireless interface module and the network. Thus, integration of wireless communications into the vending machine is provided by the wireless interface module and compatibility with a desired wireless network is provided by selecting and installing an appropriate transceiver for the wireless interface module.

The present invention allows the installer of a vending machine at a distributed geographic location to determine an appropriate wireless network by testing different wireless transceivers to determine which wireless transceiver establishes the best performance at the location from among the different available networks. For instance, wireless networks having a generally weak signal are eliminated from consideration and a preferred wireless network is then selected from those having an acceptable signal based on technical and business considerations such as cost. The wireless interface module provides one or more different types of interfaces for the different types of transceivers, such as appropriate buses and power connections. Further, plural transceivers and a variety of peripheral devices are supported by the wireless interface module to provide redundant local area and personal area networks as well as multimedia, security and payment system functionalities.

The present invention provides a number of important technical advantages. One important technical advantage is that machines are easily distributed over geographical regions with wireless communications that are compatible with different wireless communications systems operable in the geographical regions. The wireless interface module is embedded in the machine to communicate with the machines internal components, such as by inserting the wireless interface module into a slot of a machine's mother board or controller. Different wireless transceivers are then available to interface with the wireless interface module so that the transceiver most compatible with the geographic region is installed into the machine.

Another important technical advantage of the present invention is that it allows the embedding of an integrated wireless communication system into distributed industrial and commercial machines, such as vending machines, with reduced cost and increased reliability. The machines adapt to a variety of wireless networks without including compatibility for each potential type of network in each machine. The most appropriate wireless transceiver or transceivers are installed for each location so that unnecessary transceivers are not included into the machines.

Another important technical advantage of the present invention is the reduced expense and complexity for deploying industrial and commercial machines with integrated wireless communications. Reduced production and deployment costs are achieved by leveraging machine systems, such as power, to support the wireless interface module and by eliminating extra enclosures generally associated with aftermarket systems. Further, only minor alterations are necessary to adapt machine controllers to communicate with the wireless interface module without substantial re-engineering of machine controller firmware and with minor incremental hardware costs since the wireless interface module is installable as an optional daughter card and the actual wireless transceiver is selectable based on the desired wireless network.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments of the invention and its advantages are best understood by reference to FIGS. 1-4, wherein like numerals indicate like and corresponding parts of the invention.

The present invention aids in the distribution of commercial and industrial machines, such as vending machines, with embedded wireless communications systems through distributed geographic regions. Machine manufacturers may incorporate a wireless interface module and communicate control and status information to a wireless interface module, such as through a standard interface. For instance, the wireless interface module collects vending information from buses and other data sources of the vending machine through an internal interface that allows incorporation of the wireless interface module or card into the vending machine itself. The wireless interface module prepares that information for transmission over wireless networks and then provides the information to a removably coupled wireless transceiver.

The present invention allows industrial and commercial machines, such as vending machines, to be shipped "wireless ready" and yet easily adapted to communicate with a desired wireless network by coupling a wireless transceiver associated with the wireless network to the wireless interface module. Further, by interfacing the wireless interface module as a daughter card that fits into a standardized slot or other standardized connector of the machine controller, the expense of integration of a wireless system can be avoided when desired by not installing the daughter card while the flexibility of future conversion to a wireless system remains. In alternative embodiments, the present invention can be incorporated with a variety of industrial and commercial machines to communicate with a wireless network, such as HVAC, pipeline controllers, water treatment, copy machine and fountain beverage controllers.

Figure 1:
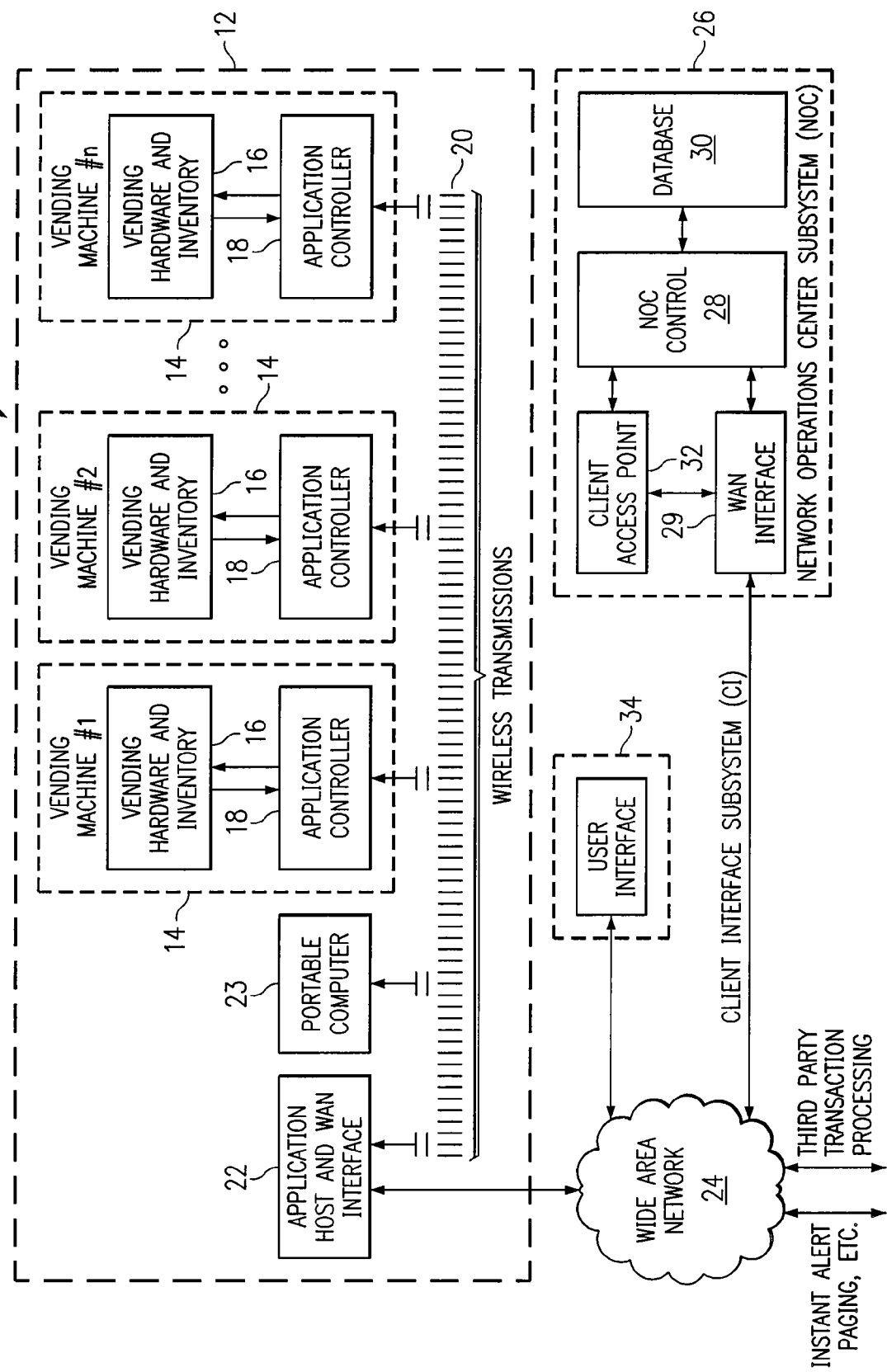
FIG. 1 illustrates a block diagram of vending machines interfaced through wireless or wireline networks.

An example of vending machines interfaced through a wireless network is depicted by FIG. 1. A remote data acquisition system for vending machines, indicated generally at 10 communicates information from a vending site 12 externally over a wide area wireless network (WAN) and internally over a local area wireless network (LAN). As shown, the local area network at vending site 12 can be referred to as a vendor interrogation LAN subsystem (VIL). Vending site 12 may include only one vending machine 14 or a plurality of vending machines 14. Each vending machine 14 may include vending hardware and inventory 16 for performing vending functions and electronically tracking some vending information. Vending machines 14 may provide various types of products to customers such as soft drinks, snacks, etc.

Vending machines 14 include an application controller 18 coupled to and interfacing with vending hardware and inventory 16. As described in greater detail with respect to FIGS. 2-3, application controller 18 includes a wireless interface and a transceiver for WAN, LAN and point-to-point communications. Many vending machines 14 are equipped with a controller for controlling vending operations as well as tracking some vending events such as money received, change given and number of vends from each slot. Application controllers 18 communicate with such controllers and directly sense other vending events and vending equipment parameters (e.g. compressor performance). Application controllers 18 also communicate with one another and the application host 22 via onboard wireless transceivers using wireless transmissions.

The term "wireless transmissions" is used to refer to all types of electromagnetic communications which do not require a wire, cable, or other types of conduits. Examples of wireless transmissions for use in local area networks (LAN) include, but are not limited to, radio frequencies, especially the 900 MHZ and 2.4 GHz bands, such as IEEE 802.11 and BLUETOOTH, as well as infra-red, and laser. Examples of wireless transmissions for use in wide area networks (WAN) include, but are not limited to, narrowband personal communications services (nPCS), personal communication services (PCS such as CDMA, TMDA, GSM) circuit switched cellular, and cellular digital packet data (CDPD), etc.

Together, application controllers 18 and application host 22 form a LAN supported by the wireless transmissions 20. In addition, application controllers 18 can also communicate directly with each other and with wide area network 24 to act as repeaters in case application host 22 cannot directly communicate with a particular application controller 18 while another application controller 18, which does have an established communication link with application host 22, can directly communicate.

The WAN interface 22 can be implemented in one of a number of ways. In particular, WAN interface 22 is designed to support a wide area network 24 that can be implemented via wireless transmissions. If a wireless narrowband PCS paging network is used to implement the WAN, messages from application host 22 can be communicated as digital messages through the pager network and stored in one or more dedicated message mailboxes provided by the wireless network operator. These mailboxes can be securely accessed, for example, through an Internet-based connection.

As shown in FIG. 1, a network operations center (NOC) 26 communicates with one or more vending sites 12 across wide area network 24. As mentioned, in one implementation, network operations center 26 can access mailboxes that store message transmitted by application hosts 22 at vending sites 12. In the embodiment of FIG. 1, network operations center 26 includes a NOC control 28 that communicates with wide area network 24 through a WAN interface 29. NOC control 28 can receive data acquired from and transmit data to vending sites 12, process the data and store the data into a database 30. NOC control 28 can also perform instant alert paging, direct dial alarms and other functions to provide real time notification to a vending operator upon the occurrence of certain events (e.g., out-of-stock, power outage, vandalism, etc.). NOC control 28 can also provide third party transaction processing such as allowing queries on database 30. The WAN interface 29 between NOC control 28 and the wide area network 24 can be implemented through the use of either wire-line or wireless transmissions.

At network operations center 26, a client access point 32 provides access from a client interface subsystem (CI) 34 across external network 24. In one implementation, client access point 32 can be a web-based interface allowing user access from a client computer across a network such as the Internet. Other implementations include providing a direct-dial connection between client interface subsystem 34 and client access point 32. Once connected, a user can use client interface subsystem 34 to obtain information from database 30 based upon data acquired from vending sites 12. Further, users can be provided with extended services such as trend information developed by mining and analyzing database 30.

Figure 2:
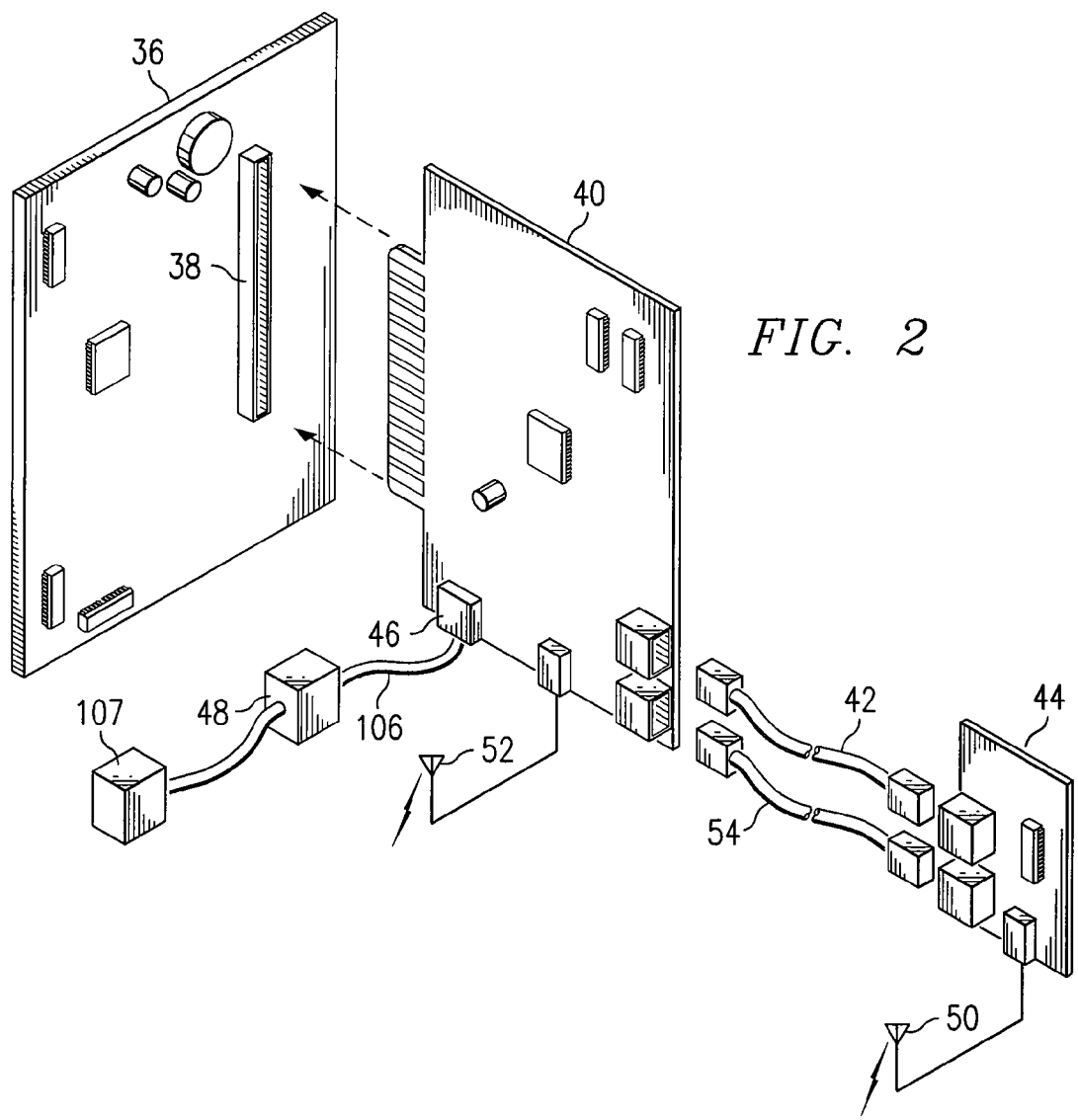
FIG. 2 illustrates a block diagram of a system incorporating a wireless interface module and transceiver for communicating with a wireless network according to one embodiment of the invention.

Referring now to FIG. 2, a schematic illustration of a system operable to communicate with a wireless network is depicted. A vending machine control system 36 is depicted that includes a bus interface, depicted as a slot or connector 38. Controller 36 is conventional hardware, firmware and software associated with vending hardware and inventory 16 in FIG. 1 except that an interface slot 38 provides a standardized bus interface slot for accepting a wireless interface module 40. Controller 36 controls vending machine electronic devices and communicates data relating to vending machine information through slot 38 to wireless interface module 40. Interface slot 38 may be any computer industry standard interface, such as industry standard interfaces including a PCI, ISA, PC104, etc. . . . slot interface operable to communicate data and power to cards inserted in the slot.

Wireless interface module 40 is operable to accept data and power from the vending machine control system 36 and to prepare the data for transmission across a wireless network. Similarly, wireless interface module 40 accepts and processes command and control data from a wireless network for transfer to controller 36. For instance, wireless interface module 40 prepares data for transmission through a data cable 42 to a wireless transceiver 44 that communicates with an associated wireless network and executes tasks, such as fetching status from the machine controller, based on command and control data received from the network through wireless transceiver 44. By removably coupling different types of wireless transceivers 44 to wireless interface module 40, controller 36 is enabled to communicate over different types of networks. Thus, wireless interface module 40 and wireless transceiver 44 perform the functions of application controller 18 in a local wireless network and the functions of application controller 18 and application host and WAN interface 22 when a vending machine 14 interfaces directly with wireless WAN 24.

Wireless interface module 40 also includes a serial data port, such as a universal serial bus (USB) data port 46, operable to couple one or more peripheral(s) 48 in a daisy chain fashion. Peripheral(s) 48 may include multi-media devices such as a speaker operable to output audio signals received via wireless interface module 40, an E-lock, or a video screen. In one alternative embodiment, a BLUETOOTH wireless system interfaces with wireless interface module 40 through USB port 46 to provide a personal area network that can be used by vending consumers to interact with the vending machine, such as for performing wireless financial or cash transactions. LED lights associated with wireless interface module 40 provide visual indications of the operability and current functions of the system.

To communicate with wireless networks, a wireless antenna 50 is coupled to wireless transceiver 44 to receive and send wireless signals. In an alternative embodiment, a wireless antenna 52 couples to wireless interface module 40 and communicates with transceiver 44 through a coaxial cable 54. Wireless transceiver 44 communicates with and receives power from wireless interface module 40 through a data and power cable 42.

In one embodiment of the invention, plural wireless transceivers 44 are coupled to wireless interface module 40 via data and power cable 42. For example, if more than one wireless transceivers 44 are coupled to wireless interface module 40, then a data line, such as a USB data line, and additional coaxial cables 54 are used to couple one or more antennae for communication with a wireless network. Similarly, USB port 46 optionally couples USB-compatible peripherals, such as one or more multi-media devices, readers/storage devices, wireless transceivers or other devices used in association with wireless interface module 40.

Figure 3:
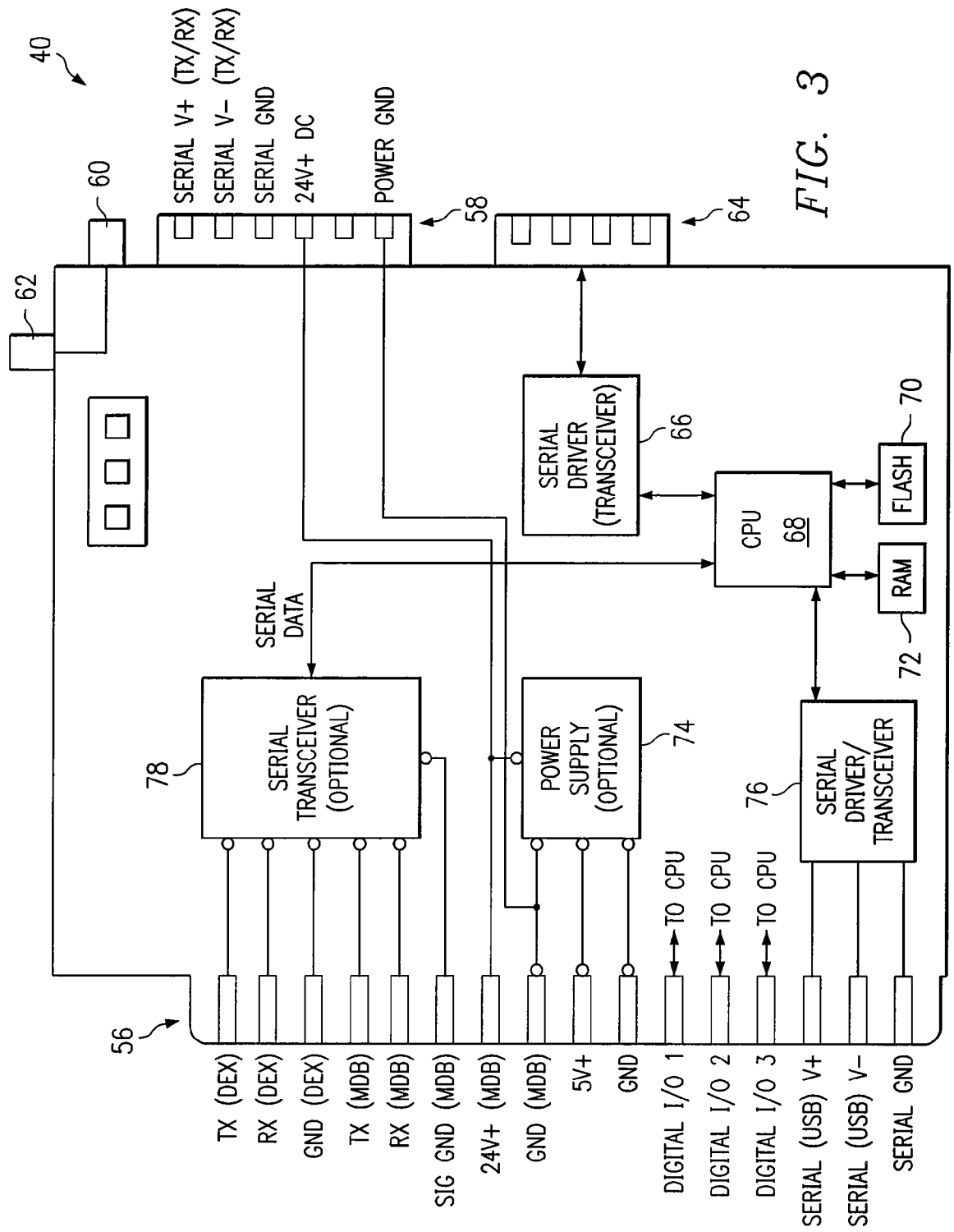
FIG. 3 illustrates a block diagram of a wireless interface module configured to accept a transceiver for interfacing a machine controller with a wireless network according to one aspect of the present invention.

Referring now to FIG. 3, a block diagram of wireless interface module 40 according to one aspect of the present invention is depicted. Wireless interface module 40 includes an interface 56, such as industry standard interfaces for PCI, ISA, PC104, or other industry standard interfaces operable to provide a communication, data, and power interface to a vending machine controller system 36 slot 38 illustrated in FIG. 2.

Wireless interface module 40 has a transceiver port 58 operable to removably couple one or more wireless transceivers 44 to communicate signals to and from wireless interface module 40 transmitted to or received from transceiver 44 as illustrated in FIG. 2. Wireless interface module 40 also has a coaxial plug 60 operable to couple an antenna which may be coupled to a second coaxial plug 62. A serial bus 64 such as a universal serial bus (USB) is coupled to a serial driver 66, CPU 68, and flash memory 70 and random access memory 72.

Wireless interface module 40 may integrate with controller 36 to obtain power or may include an optional power supply 74 operable to supply power to circuitry coupled to wireless interface module 40. Optional power supply 74 may provide power to transceiver 44 coupled to transceiver port 58, with specific levels of power provided to different transceivers as required. Alternatively, if wireless interface module 40 lacks a power supply, it passes power from the controller 36 to the wireless transceiver.

Serial driver/transceiver lines 76 communicate information between wireless interface module 40 and slot 38 as needed. Interface 56 provides a standard for simplified incorporation into vending machine designs, such as industry standard interfaces that support a MDB multi-drop bus operable to transmit and receive information communicated via optional serial transceiver 78 Other types of standards available for exchanging information between controller 36 wireless interface module 40 include USB, DEX or industry specific data formats. Transceiver port 58 also includes serial transmit and receive lines including a serial ground and power supply lines operable to provide power to a wireless transceiver 44 coupled to wireless interface module 40.

Figure 4:
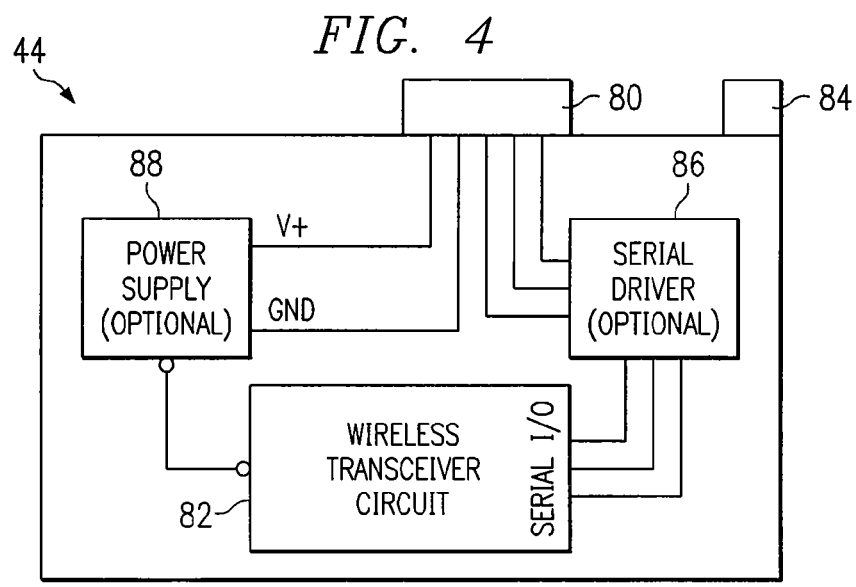
FIG. 4 illustrates a transceiver operable to communicate with a wireless network and configured to couple with a wireless interface module according to one aspect of the present invention.

Referring now to FIG. 4, a block diagram of a wireless transceiver 44 is depicted that is operable to communicate information via a wireless network according to one aspect of the invention. Wireless transceiver 44 interfaces with wireless interface module 40 illustrated in FIG. 3 and is removably coupled so that when in electrical communication, wireless transceiver 44 allows interface module 40 to communicate with a wireless communication network. Wireless transceiver 44 includes an interface receptacle 80 for communicating information and receiving power supplied by wireless interface module 40's power supply or power from system 36 routed through wireless interface module 40. Interface receptacle 80 provides a standard connection with wireless interface module 40 regardless of the type of wireless transceiver circuit 82 and associated wireless network that is supported by wireless transceiver 44. Interface receptacle 80 allows the wireless transceiver 44 to be removably coupled to wireless interface module 40 so that changing a system from an existing wireless network to a new wireless network is accomplished by decoupling the existing wireless transceiver and replacing it by removably coupling a new wireless transceiver associated with the desired wireless network.

A coaxial cable receptacle 84 is provided for coupling an antenna to wireless receiver 44. A wireless transceiver circuit 82 is coupled to a serial driver 86 and generates and receives signals for communicating information with a wireless network, such as a GSM network, an analog network or a two-way paging network. In one embodiment, a power supply 88 is also included for providing power to wireless transceiver circuit 82. Wireless transceiver 44 is preferably a printed circuit board which may be removably coupled to an interface module with conventional mounting hardware. Wireless transceiver 44 may be assembled inside a housing for simplified coupling to a system and may be configured to communicate with one or more predetermined wireless networks.

Various different types of wireless networks exist and, as such, wireless transceiver 44 may be configured to communicate with one or more wireless networks. Wireless transceiver 44 advantageously allows a machine control system to communicate with one or more wireless networks by being a removable wireless transceiver that may be replaced with alternative wireless transceivers operable to communicate with different associated wireless communication networks. For example, a first wireless transceiver may include a GSM transceiver circuit operable to communicate with a GSM network. To convert a vending machine to communicate with an analog network, the GSM wireless transceiver is removed and replaced with an analog wireless transceiver configured to communicate via an analog wireless communication network. Wireless communication of information may be provided in one or more ways. Some examples of wireless communication networks and protocols operable to be used with the present invention may include, but are not limited to, CDMA, GSM, TDMA, PCS, GPRS, CDPD, AMPS, REFLEX and UMTS.

In operation, a vending machine manufacturer builds the vending machine as wireless-ready by incorporating wireless interface module 40 to communicate with the vending machine's control system 36. The vending machine is then shipped to its operational location and provided power. A technician need only attach an appropriate wireless transceiver 44 to wireless interface module 40 to interface the vending machine with the associated wireless network. The technician simply tests reception at the location, for instance by installing different transceivers or through conventional coverage analysis techniques, to determine the most suitable wireless network and then installs the associated wireless transceiver 44. Advantageously, vending machines that are installed in network "dead zones" are simply equipped to operate with a communication system or network that has acceptable signal strength and desired data transfer ability and cost structures. Further, if the vending machine is moved at a future date, a suitable wireless transceiver 44 is installed to convert the vending machine to a different network as needed with minimal cost, time and complexity. Wireless interface module 40 detects the transceiver and network that is being used and adapts the low level communication protocols to handle transmission and reception with the network while maintaining the application level communications protocol fixed.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A system for interfacing a machine controller with a plurality of wireless networks, the system comprising:
    a wireless interface module in communication with the machine controller and configured to send and receive wireless signals;
    a wireless antenna coupled to the wireless interface module; and
    a multi-drop bus interface associated with the wireless interface module, wherein the wireless interface module is configured to removably couple to and communicate with a plurality of wireless transceivers, each wireless transceiver respectively associated with at least one of the plurality of wireless networks.

2. The system of claim 1 wherein the machine controller comprises an audit device.

3. The system of claim 1 further comprising a coaxial cable configured to communicate wireless signals between each wireless transceiver and the wireless interface module.

4. The system of claim 1 further comprising:
a first wireless transceiver configured to be removably coupled to the wireless interface module and having a GSM transceiver circuit configured to communicate with a GSM network; and
an analog wireless transceiver configured to be removably coupled to the wireless interface module and to communicate via an analog wireless communication network.

5. The system of claim 1 wherein the multi-drop bus interface comprises a serial port.

6. The system of claim 5 wherein the serial port comprises a USB port providing an interface for a BLUETOOTH module.

7. The system of claim 1 further comprising a BLUETOOTH wireless system configured to communicate with the wireless interface module through a USB port to provide a personal area network.

8. The system of claim 1 wherein the wireless interface module is adapted to accept power from the machine controller.

9. An apparatus for interfacing a machine controller with a plurality of wireless networks, the apparatus comprising:
a wireless interface module in communication with the machine controller and configured to send and receive wireless signals; and
a multi-drop bus configured to transmit and receive information communicated via a serial transceiver,
wherein the wireless interface module is coupled to a wireless antenna,
wherein the wireless interface module is configured to removably couple to and communicate with a plurality of wireless transceivers, each wireless transceiver respectively associated with at least one of the plurality of wireless networks.

10. The apparatus of claim 9 wherein the machine controller comprises an audit device.

11. The apparatus of claim 9 wherein the wireless interface module is further configured to pass power to a wireless transceiver removably coupled with the wireless interface module.

12. The apparatus of claim 9 wherein the multi-drop bus interface comprises a serial port.

13. The apparatus of claim 12 wherein the serial port comprises a USB port providing an interface for a BLUETOOTH module.

14. The apparatus of claim 9 wherein the wireless interface module is adapted to accept power from the machine controller.

15. The apparatus of claim 9 further comprising a coaxial cable configured to communicate wireless signals between each wireless transceiver and the wireless interface module.

16. The apparatus of claim 9 further comprising a BLUETOOTH wireless system configured to communicate with the wireless interface module through a USB port to provide a personal area network.

17. A method for interfacing a machine controller with a plurality of wireless networks, the method comprising:
coupling a wireless interface module to a wireless antenna;
communicating, by the machine controller, with a wireless interface module via a multi-drop bus interface associated with the wireless interface module;
removably coupling the wireless interface module to a wireless transceiver associated with at least one of the plurality of wireless networks, wherein the wireless interface module is configured to removably couple to and communicate with a plurality of wireless transceivers, each wireless transceiver respectively associated with at least one of the plurality of wireless networks; and
communicating, by the wireless interface module, with the wireless transceiver.

18. The method of claim 17 wherein the multi-drop bus interface comprises a serial port.

19. The method of claim 18 wherein the serial port comprises a USB port providing an interface for a BLUETOOTH module.

20. The method of claim 17, further comprising receiving, by the wireless interface module, power from the machine controller.

* * * * *